May 29, 1962 L. SCHINDLER 3,037,080
TELECOMMUNICATION RECEIVER
Filed June 7, 1960
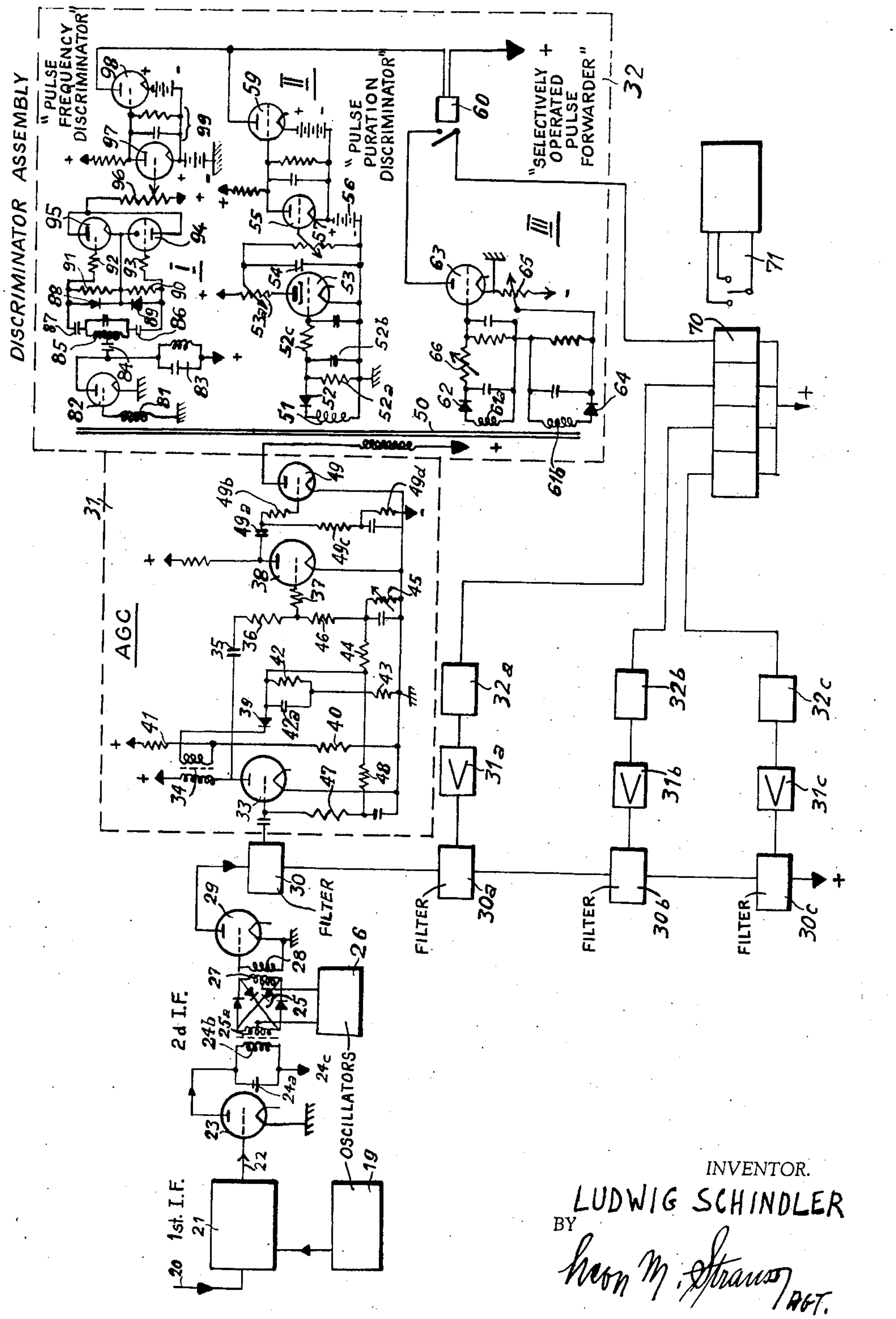
INVENTOR.
LUDWIG SCHINDLER
BY
[signature] AGT.

United States Patent Office 3,037,080

Patented May 29, 1962

3,037,080
TELECOMMUNICATION RECEIVER

Ludwig Schindler, Metzerstrasse 34, Heilbronn 14b, Germany

Filed June 7, 1960, Ser. No. 34,493
7 Claims. (Cl. 178—88)

The present invention relates to a telecommunication installation and, more particularly, to a signal receiving for teleprinter systems in which a transmitter transmits telegraphic signals which are transformed into characters in the receiver.

Radio teleprinting systems are often equipped with a transmitter having only a comparatively low output and which transmits the signals in the frequency range below ten megacycles. The frequency bands of this range are, however, considerably overloaded, so that a precondition for a perfect transmission of communications is a satisfactory discrimination against adjacent transmitters. Account must further be taken of the fact that interference signals may be present within the transmitter's band width, and which may decisively jam transmission. Further perfection of the transmission safety with respect to outside radio services is not possible by further refinement of the present circuit designs, i.e. by a more improved selectivity and volume control.

It is therefore a principal object of the present invention to provide a telecommunication installation for teleprinter systems so protected against any interference from outside radio services or from atmospherics that the quality of the transmission is practically not detrimentally affected.

Telecommunication systems of the type in which several channels carrying the same communication establish connection between the transmitter and the receiver are known. Such a system is, by way of example, disclosed in U.S. application Serial No. 371,703, filed on July 31, 1954, now Patent No. 2,951,936, issued September 6, 1960, of which the present application is a continuation in part.

In this system, the teleprinter symbols are transmitted over four frequencies, using frequency shift keying with two frequencies each for interval signals and for symbol signals. The tuning of the transmitter and the receiver is effected by a high-frequency scanning process utilizing fixed crystal stabilized frequencies. The signals received are so mixed in the receiver that four channels are obtained, by way of example, in the frequency range between ten and 20 kilocycles per second, all these channels carrying the full information. Two channels will then transmit a signal if the communication transmitted requires a signal while the other two channels will transmit a signal only if the communication transmitted requires a pause, i.e. an interval between two signals. It can be seen that all four channels transmit the full communication content. All four channels are then connected to a device, e.g. via a polarized relay, which transforms the communication signals transmitted which are then printed as usual in teleprinter systems.

If interference occurs in one channel of this system, the relative channel must be switched off so that it does not effect transmission and transmit imperfect communications.

The present invention has for its object to provide, in a receiver of a multi-channel system for the transmission of teleprinter signals, means ensuring that each channel which transmits an interference is switched off so that the transmission of signals is not detrimentally affected.

According to the present invention, it has been found that interference prohibiting perfect transmission of communications is caused by impulses which usually last longer than the impulses which transmit the communication in the form of signals.

It is therefore a further object of this invention to provide, in a multi-channel communication transmitting system, means ensuring that a channel is disconnected from further communication processing in the event that impulses occur which exceed a predetermined duration.

The present invention has further shown that the majority of disturbances are of a frequency at least partly different from the frequency of the operative signal.

The invention accordingly has for a further object to provide, in a multi-channel communication transmitting system, means in each channel which will disconnect such channel from further communication processing in the event of the occurrence in it of a frequency other than that of the operative signal.

These and other advantages and features of the invention will be disclosed in greater detail in conjunction with the attached drawings, in which FIG. 1 is the wiring diagram of a receiver according to this invention designed to receive the high-frequency energy transmitted by a transmitter.

In the receiver shown in FIG. 1, high-frequency oscillations received by the aerial 20 are applied to a unit 21 which contains the amplifier circuits, tuning circuits, frequency changers and band filters found in any receiver. These units being generally known, a detailed description is here dispensed with. The structural unit 21 has also applied to it an A.C. signal from an oscillator 19. This signal is so mixed with the input signal received from aerial 20 that an intermediate-frequency signal of, by way of example, 480 kc.p.s. ± the frequency of the low-frequency signal is produced at the output of the unit 21. The oscillator 19 is preferably quartz controlled. The intermediate-frequency signal is transmitted to an amplifier tube 23 of which the anode is connected, via a filter circuit comprising the condenser 24*a* and the inductance 24*b*, to a direct voltage source as indicated by the arrow at 24*c*. Inductively coupled to the inductance 24*b* of the filter circuit is a further inductance 25*a* which forms part of a mixing circuit 25. Connected to this circuit in the manner shown is an oscillator 26 which oscillates, by way of example, at a frequency of 465 kc.p.s. and supplies the signal with which the signal supplied by the tube 23 is to be mixed. The mixing circuit further includes four diodes, are connected as shown in FIG. 1 from each end of inductance 25*a* to opposite ends of an output inductance 27. Mixing the modulated intermediate frequency of 480 kc.p.s. with the oscillation frequency of 465 kc.p.s supplied by oscillator 26 produces intermediate frequencies of 15 kc.p.s. ± the frequency of the low-frequency signal supplied by the multivibrator 4 of the transmitter of my said co-pending application, for example. Assuming that these low frequency signals are transmitted at frequencies of 1000 and 1500 c.p.s. the frequencies 14 and 16 kc.p.s. or 13.5 and 16.5 kc.p.s. will appear at the output of the mixing circuit. The signals so produced are transmitted to an amplifier tube 29 by means of the inductance 28.

This amplifier tube 29 is connected, via four filters 30, 30*a*, 30*b*, 30*c*, with the positive pole of the D.C. voltage source, the filters being tuned to the said frequencies of 13.5, 14, 16 and 16.5 kc.p.s. respectively. From these filters, the communication signal is transmitted in four completely identical signal channels, each connected to a different one of the filters. Connected to the output each filter is a regulated amplifier 31, 31*a*, 31*b*, 31*c* respectively, each of these amplifiers having its output connected to selective circuit 32, 32*a*, 32*b*, 32*c* respectively. The channels 31/32 and 31*a*/32*a*, of which the filters 30 and, respectively, 30*a* may be tuned to the frequencies 14 and, respectively, 16 kc.p.s., will receive a signal when the switch T of the transmitter of my said copending application is closed, while the channels 31$b$/32$b$ and 31$c$/32$c$ will receive a signal when such switch T is open. Since the channels are identical, only one such channel, comprising the amplifier 31 and the selective circuit 32, will now be described in greater detail.

The signal emerging from the filter 30 is applied to a variable-mu tube 33 whose cathode is grounded and whose anode is connected, via a transformer 34, with the positive pole of the D.C. voltage source. The alternating voltage appearing at the anode of tube 33 is supplied, via a condenser 35, a resistance 36 and a protective resistance 37, to the control grid of a further variable-mu tube 38. Both the tube 33 and the tube 38 are so controlled by means of the voltage of the secondary winding of the transformer 34, in a known manner, that fluctuations in the input amplitude are compensated. The alternating voltage induced in the secondary winding of the transformer 34 is rectified by means of the rectifier 39 connected to one end of this winding. The other end of the secondary winding is kept at a predetermined potential by means of the voltage divider comprising the resistance 40 and 41, for the purpose of delaying the compensation adjustment. The end of the diode 39 not connected to the transformer 34 is grounded, on the one hand via the resistances 42 and 43, on the other, via the resistances 44 and 45, the resistance 45 being preferably adjustable. The control grid of tube 38 is connected to the junction of the resistances 44 and 45 via the resistances 46 and 3, while the control grid of the tube 33 is connected to the diode 39 via resistances 47 and 48. Arranged parallel with the resistance 42 is a condenser 42$a$ which causes a retardation in the control so that rapid potential alterations are not controlled. If the alternating voltage signal appearing at the anode of the tube 33 decreases in amplitude, the direct current passing through the rectifier 39 will decrease as well and, along with it, the voltage at resistance 45. However, this will reduce the grid control voltage of the tubes, which raises amplification and restores the previous level of the signal amplitude.

The alternating signal voltage from the tube 38 is fed, via a separating condenser 49$a$ and a resistance 49$b$, to the grid of a tube 49 which is strongly biased negatively so that only signal amplitudes which exceed a predetermined amplitude can be transmitted. The resistances 49$c$ and 49$d$ are designed to apply the negative grid bias. From the tube 49, the signal is applied to the primary winding of a transformer 50. Owing to the negative grid bias of the tube 49, only those signals which exceed a potential determined by the predetermined bias are transmitted, so that disturbances of a low amplitude are eliminated.

The signal leaving the tube 49 is fed to a selective circuit generally designated by 32. This selective circuit contains three sections, I, II and III.

The part circuit or section I is designed, as will be described in greater detail below, to measure the frequency of the incoming signal and to produce an interference signal if the frequency of the incoming signal differs too greatly from the rated value. The circuit II measures the length of the incoming individual signals and produces an interference signal if the duration of the signal exceeds a value which an operative signal can never attain. If such a long signal is received, it can only be an interference signal, so that the interference signal is an indication that the incoming signal is not a true signal, i.e. is a signal which has not been transmitted for communication by the transmitter but which has been transmitted e.g. by other radio radio services.

The interference signals from the sections I and II are applied to the winding of a relay 60 of which a contact disconnects the section III from a polarized relay 70 which is designed further to process the received communication. The circuit III is therefore not in a position to transmit an input signal if the circuits I or II indicate, by transmitting an interference signal, that the signal transmitted in the relative channel is an interference signal.

The part circuit I will now be described in greater detail. As stated above, it is designed to issue an interference or blocking signal if it has received an alternating voltage signal of which the frequency deviates from the frequency to which the associated filter 30 is tuned.

The voltage to be checked for the part circuit I is taken from the secondary winding 81 of a transformer 50. One end of this secondary winding is grounded while the other end is connected with the grid of a tube 82 whose cathode is grounded. The alternating voltage of the secondary winding 81 is therefore applied across the grid and the cathode of the tube 82. The anode of this tube is connected to a filter circuit 83 consisting of a condenser and an inductance connected in parallel. The other end of this filter circuit is connected to the positive pole of the voltage source for application of the anode voltage to the tube 83 as indicated by the arrow and the plus sign (+). The filter circuit 83 is tuned to the same frequency as the filter 30. Naturally, the corresponding filter circuits of the other three channels are also tuned to the frequency of the associated input filters 31$a$, 31$b$ and 31$c$, i.e. to 13.5 kc.p.s., 14 kc.p.s., 16 kc.p.s. and, respectively, 16.5 kc.p.s.

The anode of tube 82 is also connected, via a condenser 84, with the center tap of an inductance which forms, together with a parallel connected condenser, a filter circuit 85 which is also tuned to the frequency of the associated filter 30, i.e. to the same frequency as the filter circuit 83. The filter circuit 83 forms part of a discriminator. No alternating voltage signal can appear at the ends of the inductance of filter circuit 85 while the potential of secondary winding 81 has a frequency to which the two oscillatory circuits 83 and 85 are tuned. If the frequency is different from the rated frequency, i.e. if an interference is transmitted, a voltage employed to obtain an interference signal will appear at the end points of the filter circuit 85.

For this purpose, condensers 86 and 87, respectively, connect the end points of the inductance of the filter circuits, via respective resistances 92 and 93, to the grids of two respective electronic tubes 94 and 95. For rectification of the alternating voltage present in the event of an interference, two rectifiers 88 and 89 are provided which are located between the interconnected cathodes of the two tubes 94 and 95 and the end points of the grid resistances 92 and 93. The effect of the rectifiers is aided by resistances 90 and 91 connected in parallel with each rectifier.

The occurrence of interference signals having a higher or lower frequency than the signal frequency causes the discriminator to supply both a positive and a negative voltage. The negative voltage can become freely operative on the grid of one electronic tube 94 or 95, while the positive voltage is limited by the grid current through one of the two resistances 92 or 93 so that the total anode voltage of the two interconnected tubes is reduced owing to the current drop in one tube when interference signals are transmitted.

The drawing shows that the interconnected anodes of the two tubes 94 and 95 are connected with the positive pole of the voltage source across a resistance 96. A tap of this resistance 96 is connected to the grid of a further amplifier tube 97. If the total anode current of the two tubes 94 and 95 decreases, the voltage at the grid of tube 97 will rise so that this tube becomes conductive. As a consequence, the voltage at its anode drops, which causes the grid of a further amplifier tube 98 to become more negative. This further tube 98 is thus blocked, i.e. its anode current is substantially reduced.

The anode voltage of tube 98 is applied to the winding of a relay 60. If the anode current decreases, the energization of the relay winding will drop so that the associated relay contact is opened. Such a disconnection causes the channel described to be disconnected.

The drawing shows that the anodes of the tubes 94 and 95 are electrically connected to the grid of the tube 97, i.e. without an intermediate element transmitting only A.C. In the same manner, the anode of the tube 97 is electrically connected to the grid of the tube 98 so that interference signals can be transmitted with very little time delay. D.C. voltage sources not designated more particularly are provided at the cathodes of the two tubes 97 and 98 to produce high direct-current potentials.

In the circuit disclosed, disturbances caused by the operation of the relay 60, when interference signals are received comparatively often, must be avoided. In order to prevent such disturbances, an RC combination 99 is connected in parallel with the tube 97. On termination of an interference signal, the tube 98 is blocked for a period corresponding to the time constant of this RC combination. Only if no new interference signal has been received during that period will the tube 98 again become conductive and the channel be cut in by the relay 60.

It will thus be understood that circuit I is so designed that it prevents transmission of signals from this channel in the event of an interference signal, having a frequency which deviates from the rated frequency of the channel involved, is received.

The circuit II is designed to produce an interference signal and to transmit it to relay 60, if the duration of a received signal exceeds the normal duration of a communication signal.

As previously stated, most interferences consist of impulses having a duration substantially longer than that of the communication signals. If a received signal has a duration which exceeds that of a communication signal, it must be an interference signal, so that the channel in which it is transmitted must be cut off from signal processing.

The circuit II is connected to the secondary winding 51 of the transformer 50. The alternating voltage of this winding is rectified by the diode 52. For the equalization of the rectified voltage, a parallel circuit comprising a resistance **52*a* and a condenser 52*b* is provided; the time constant of this RC combination, however, is below the duration of a communication impulse. The rectified alternating voltage is applied to the grid of a tube 53 through a resistance 52*c*. This tube is conductive while no signal appears at its grid. If such a signal is received, the rectifier 52** produces a negative grid bias for this tube, so that the latter is blocked.

A potentiometer **53*a* is connected to the anode of tube 53 and this potentiometer is also designed to supply the anode voltage for the tube 53. The adjustable tap of the potentiometer 53*a* is connected to the parallel circuit formed of the condenser 54 and a potentiometer 57. It will be readily appreciated that, if the tube 53 becomes blocked owing to a negative voltage applied to its grid, the voltage at the condenser 54 will rise and continue to rise as long as the tube 53 remains blocked. In the same manner the voltage at the tap of the potentiometer 57 will rise. The tap of this potentiometer is directly connected to the grid of a tube 55 which is normally blocked owing to the battery 56 arranged in its cathode supply lead. If the impulse received at the grid of the tube 53 is of a duration longer than that of a normal communication signal, the voltage at the tap point of the potentiometer 57 rises sufficiently for the tube 55** to become conductive.

The tube 55 and the following tube 59 are connected in the same manner as the tubes 97 and 98 of section I, so that no repetition of the description is needed. As soon as a disturbance occurs, the tube 55 becomes conductive while the current flow through the tube 59 decreases, which causes the relay 60 to release and the associated channel to be cut off from further signal processing.

It can therefore be seen that the circuit II measures the duration of the impulses received and then causes the channel to be cut off if the impulses transmitted by it exceed the duration of a communication signal.

The circuit III will now be described. This circuit is designed to obtain the communication signal; if the two other circuits I and II do not relay the presence of an interference, the output signal of circuit III is transmitted to the signal processing relay 70, which constitutes the information processing unit.

The input voltage for the circuit III is derived from the two secondary windings **61*a* and 61*b*, each of which is connected to a respective one of the rectifiers 62 and 64. Both rectifier circuits are connected to a tube 63; the potentiometer 65 enables a grid voltage to be set for tube 65 such that, in the event that no signals are transmitted, this tube will carry a medium current, i.e. that it is responsive to current variations in either direction. RC combinations having time constants small in comparison with the longest communication signal are provided in each rectifier circuit. The time constants are, more particularly, so selected that a current pulse will build up additional grid bias, which will decrease only slightly, however, during the longest gap between two impulses. The anode current in tube 63 will therefore be smaller between impulses than the value set by the potentiometer 65, i.e. it will be smaller than the load current. The direct voltage produced by the rectifier 62 is larger than the direct voltage produced by the rectifier 64, so that the anode current in the tube 63 will increase during an impulse. The rheostat 66 enables the impulse voltage to be so adjusted that, relative to the load current set by the potentiometer 65**, the current drop during the impulse is just as large as the current drop during the gaps between impulses.

Provided that the relay contact has not been opened by one of the two circuits, the anode current of the tube 63 passes through a winding of the telewriter collecting relay 70.

The above description shows that, by way of example, four signal transmitting channels which transmit signals with the same communication content operate on the same telewriter collecting relay while those channels in which an interference signal without communication content is transmitted are cut off during such latter transmission.

A preferred embodiment for the provision of the four signal channels and the generation of the corresponding high-frequency oscillations has been disclosed; however other systems for the provision of the four signal channels may be employed as well.

Having thus described the invention, what is claimed as new and desired to be secured by Letters Patent, is:

1. A receiver for a telecommunication system having several channels transmitting the same information to a common information transmitting unit, each channel comprising an amplifier circuit, a first circuit means connected to said amplifier circuit, said first circuit means having tuning means tuned to a predetermined frequency and adapted to deliver an output signal when the frequency of the signal transmitted in said channel deviates from said predetermined frequency, a second circuit means connected to said amplifier circuit, said second circuit means including a relay means interconnecting said second circuit means with said information transmitting unit, said relay means further being connected to said first circuit means to be energized when said output signal is delivered so that, when a signal having a frequency deviating from said predetermined frequency is transmitted, the relay means disconnects said second circuit means from said information transmitting unit to prevent the transmission of extraneous signals thereto.

2. A receiver for a telecommunication system having several channels transmitting the same information to a common information transmitting unit, each channel comprising an amplifier circuit, a first circuit means connected to said amplifier circuit and adapted to respond when a signal is delivered thereto having a duration exceeding a predetermined value and to deliver an output signal due to said responding, a second circuit means connected to said amplifier circuit, said second part circuit means including a relay means interconnecting said second circuit means with said information transmitting unit, said relay means further being connected to said first part circuit to be energized when said output signal is delivered, so that when a signal having a duration exceeding said predetermined duration is transmitted, the relay means disconnects said second circuit means from said information transmitting unit to prevent the transmission of extraneous signals thereto.

3. A receiver for a telecommunication system having several channels transmitting the same information to a common information proceeding unit, each channel comprising, in combination, an amplifier circuit, a first circuit means connected to said amplifier circuit, said first circuit means having tuning means tuned to a predetermined frequency and adapted to deliver an output signal when the frequency of the signal transmitted in said channel deviates from said predetermined frequency, a second circuit means connected to said amplifier circuit and adapted to respond when a signal, having a duration exceeding a predetermined value, is delivered thereto by said amplifier circuit and, due to said responding, to deliver an output signal, a third circuit means connected to said amplifier circuit and including a relay means interconnecting said third circuit means with said information proceeding unit, said relay means further being connected to said first part circuit and said second part circuit to be actuated when an output signal is delivered by said first or said second circuit means, so that, when a signal is transmitted the frequency of which deviates from a predetermined value or the duration of which exceeds a predetermined value, the relay means electrically disconnects said third circuit means from said information transmitting unit to prevent the transmission of extraneous signals thereto.

4. In a receiver for a telecommunication system having several channels transmitting the same information to a common information transmitting unit, each channel comprising an amplifier circuit, a first circuit means connected to said amplifier circuit, said first circuit means including a rectifier circuit connected to said amplifier circuit, a resistor and a capacitor in parallel connection, a triode electronic valve, said resistor and said capacitor being connected to the grid of said valve, a negatve bias voltage source connected to said grid, said parallel connected resistor-capacitor rises further being connected to said rectifier circuit so that the voltage across said parallel connected resistor-capacitor rises when a signal is applied thereto, and an interference signal is delivered by the anode of said valve when the rectified signal exceeds a predetermined duration, a second circuit means connected to said amplifier circuit and including a second rectifier and a relay means interconnecting said second circuit means with said information proceeding unit, said relay means further being connected to said first circuit means to be actuated when said interference signal is delivered, so that. when a signal having a duration exceeding said predetermined duration is transmitted, the relay means disconnects said second circuit means from said information transmitting unit to prevent the transmission of extraneous signals thereto.

5. A receiver for receiving high frequency signals havings a predetermined duration and in the form of side bands of a suppressed carrier, comprising frequency-stabilized oscillator means, high-frequency amplifier means at the input of said receiver for amplifying said received signals, first mixer means operatively connected to said frequency-stabilized oscillator means and said high-frequency amplifier means to convert the frequency of said side bands to an intermediate frequency and to add a carrier frequency to said side bands, channel filter means in circuit with said mixer means for selectively transmitting said side bands as modulations of said added carrier frequency, second mixer means operatively connected to said oscillator means for deriving a generated lower frequency substantially equal to said carrier frequency, said second mixer means being connected to said channel filter means to demodulate said carrier frequency to derive said relatively low frequency signals constituted by said predetermined side bands, channel circuit means including signal selection means operatively connected to the output of said channel filter means for separating said relatively low frequency signals from one another into individual channels, respective limiter means connected to the outputs of said signal selection means and operable to cut out all of said relatively low frequency signals the duration of which exceeds said predetermined value, means for transforming said signals into an intelligible message, said last-named means being operatively connected to the outputs of all of said limiter means, intermediate frequency amplifier means in circuit between said first mixer means and said channel filter means to amplify said intermediate frequency, said limiter means including nonlinearly operating circuit elements, and control potential circuit means having one part operatively connected to said limiter means, respectively, to said intermediate frequency amplifier means, and to said high-frequency amplifier means, whereby control potentials may be taken from said limiter means and applied to said intermediate frequency amplifier means and to said high-frequency amplifier means to reduce distortion of said signals by fading phenomena.

6. A receiver according to claim 5, said control potential circuit means also including a source of bias voltage operatively connected between said intermediate frequency amplifier means and said limiter means, said bias voltage normally tending to prevent interference by undesired signals, a part of the energy of said intermediate frequency carrier being employed as a further control potential and applied in bucking relationship to said bias voltage, and means actuated by excess of said further control potential over said bias voltage, due to excessively strong interfering signals present in said intermediate frequency amplifier means, for cutting out any affected channel to prevent overloading thereof by said interfering signals.

7. In a telecommunication system, a receiver having plural channels transmitting the same information to a common information transmitting unit, each channel comprising first circuit means connected to the channel input and including signal discriminating means providing an output signal when a characteristic of the input signal to such channel differs from a predetermined normal characteristic, and a second circuit means connected to the channel input and including a relay normally connecting said second circuit means to said common information transmitting unit; said relay being connected to said first circuit means for transfer by an output signal of said discriminating means; whereby, during the appearance in such channel of an output signal having such differing characteristic, said second circuit means is disconnected from said common information transmitting unit to prevent transmission of extraneous signals to the latter.

References Cited in the file of this patent

UNITED STATES PATENTS

| | | |
|---|---|---|
| 2,397,884 | Rhodes | Apr. 2, 1946 |
| 2,397,885 | Rhodes | Apr. 2, 1946 |
| 2,424,961 | Bancroft et al. | Aug. 5, 1947 |